Aug. 12, 1952 R. C. RUSSELL 2,606,638
ELECTROMAGNETIC CLUTCH
Filed March 31, 1945 2 SHEETS—SHEET 2

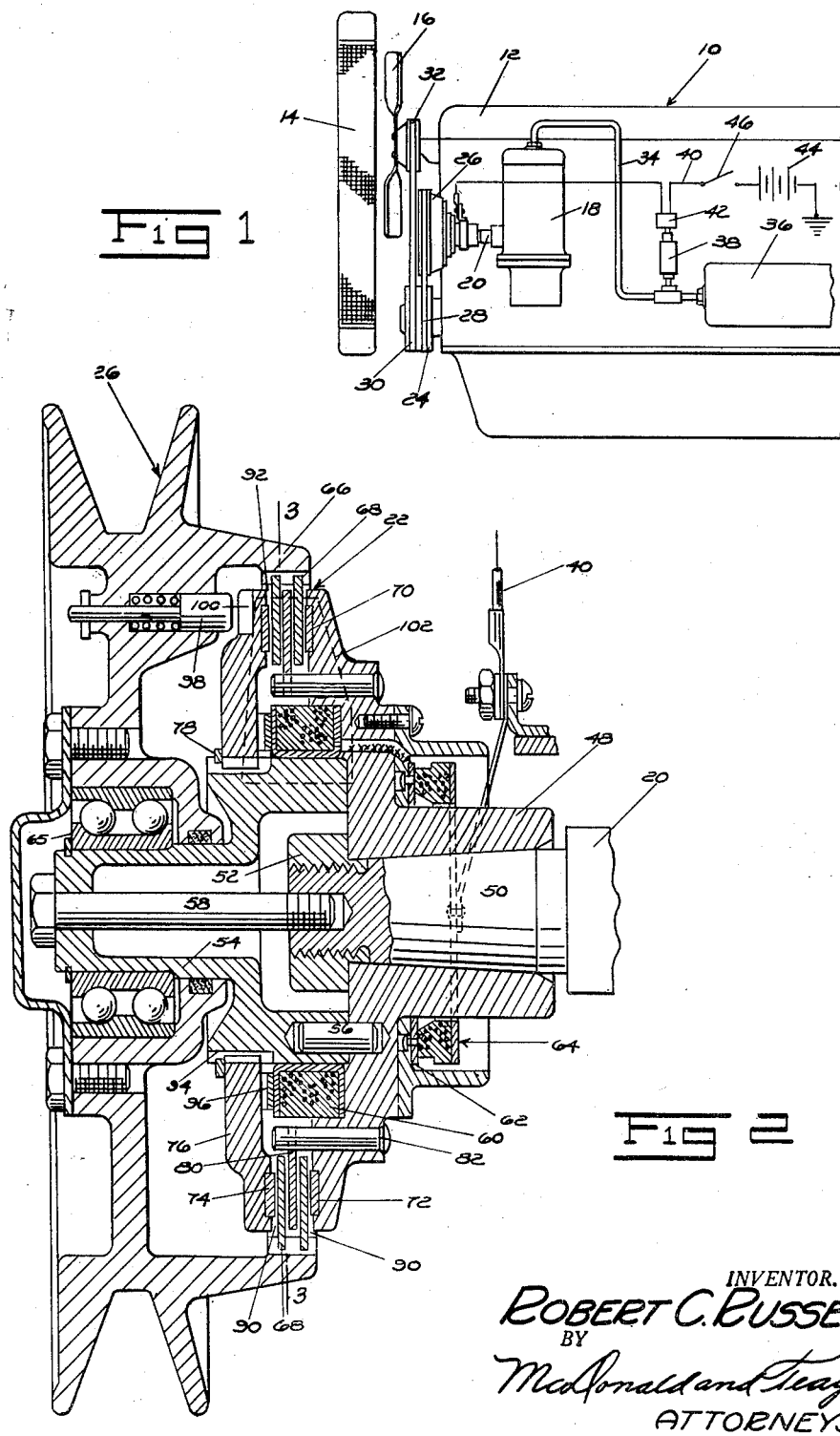

INVENTOR.
Robert C. Russell
BY
McDonald and Teagno
ATTORNEYS

Patented Aug. 12, 1952

2,606,638

UNITED STATES PATENT OFFICE 2,606,638

ELECTROMAGNETIC CLUTCH

Robert C. Russell, Cleveland Heights, Ohio, assignor to Eaton Manufacturing Company, Cleveland, Ohio, a corporation of Ohio Application March 31, 1945, Serial No. 585,993

2 Claims. (Cl. 192—84)

This invention relates to electromagnetically actuated drive means and more particularly as applied to air compressors and is co-pending with my application Serial No. 585,992, filed March 31, 1945, now Patent No. 2,452,264, defining similar material hereto.

Broadly the invention comprehends an electromagnetically actuated disk friction clutch for driving an air compressor, said clutch in turn being controlled for operation by an air pressure valve associated with the air storage tank of the compressor.

In the past employment of air compressors on motor vehicles as a source of air pressure for operating auxiliary equipment associated with the vehicle, it has been the general practice to drive the air compressor from the vehicle motor at a speed proportionate thereto continuously with the operation of the motor. Inasmuch as it has been found unnecessary to operate air compressors continuously with the engines to which they are associated for the purpose of building up a sufficient supply of compressed air for generally required needs, any period of operation beyond necessity merely acts to shorten the life of the compressor. The instant invention is aimed at providing pressure controlled drive means for an air compressor such that the air compressor is intermittently shut off upon the attainment of a predetermined pressure thus lessening the over-all operating time of the air compressor compared to engine operating time.

An object of the invention is the provision of an electromagnetic disk friction drive for an air compressor.

Another object of the invention is the provision of an electromagnetic air pressure controlled drive adaptable to replace previous standard air compressor drives without necessity of altering structural dimensions.

Another object of the invention is the provision of an electromagnetic air pressure controlled disk friction drive for an air compressor.

A further object of the invention is the provision of an electromagnetic multiple disk friction drive for an air compressor, said drive controlled by a switch actuated in response to variations in the pressure of the air delivered by the compressor.

A yet further object of the invention is the provision of an electromagnetic disk friction clutch of compact design and efficient operation as a drive for an air compressor.

A still further object of the invention is the provision of a drive for air compressors such that the air compressor is disengaged when an ample air pressure is supplied and thus provided a horse power saving for the vehicle engine.

Other objects and advantages of the invention will appear from the following description taken in connection with the drawings forming a part of the specification, and in which:

Figure 1 is a diagrammatic elevational view showing a vehicle motor and the associated air compressor and drive means therefor;

Figure 2 is a side elevational view of the air compressor drive constituting the basis of the invention.

Figure 3:
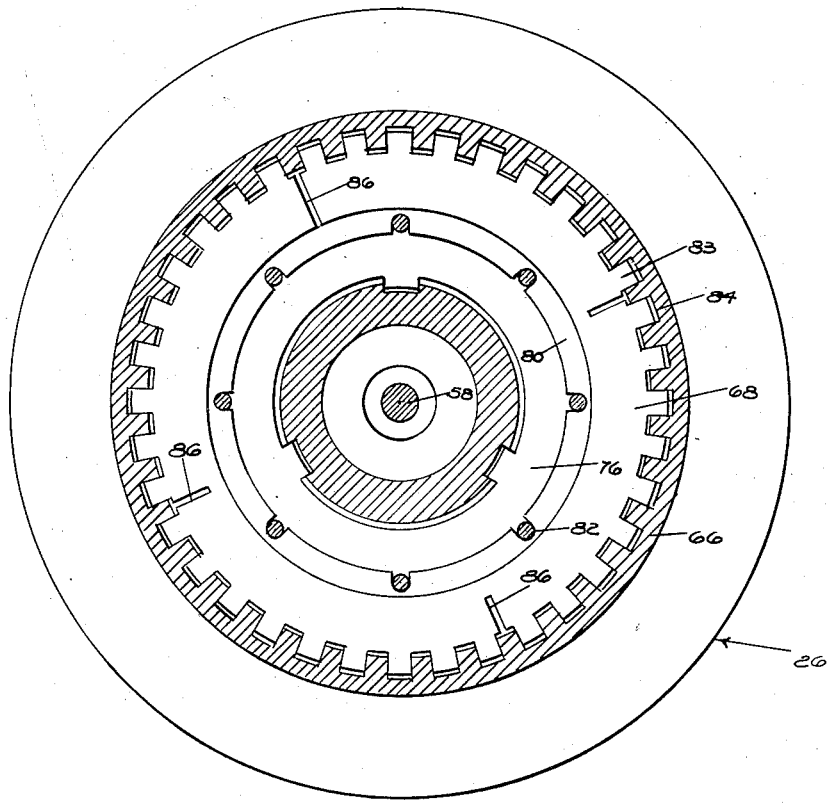
Figure 3 is a vertical sectional view through line 3—3 of Figure 2.

Inasmuch as this invention is premised upon the controlled operation of an air compressor associated with a motor vehicle, it, of necessity, required the provision of an effective clutch means easily controlled for engagement or disengagement of compressor operation.

The clutch covered by this invention is adaptable to a standard compressor drive without necessitating any changes in pulley diameter, compressor shaft diameter, or axial distance between compressor shaft and pulley.

The clutch devised herein for effecting driving connection between an engine driving source and an air compressor comprises a plurality of friction disks electromagnetically operated and air pressure controlled whereby the air compressor is operated intermittently as per requirements to maintain a sufficient compressed air supply for operational use of air brakes and the like. An air pressure switch is inserted in the electrical line delivering current to the electromagnetic clutch and is actuated upon a predetermined pressure attainment in the pressure line connected between the air compressor and supply tank thus providing an effective control for the clutch which in turn controls compressor operation. It is obvious wherein air pressure operated mechanisms such as air brakes are employed on motor vehicles and are air compressor supplied that the comparative operating time of the air brakes to the engine is negligible with the consequence that the air compressor need only be operated over a period necessary to maintain sufficient operating pressure. By so limiting the operational time of the air compressor it is possible to appreciably prolong the life of the air compressor and its associated part with a resultant economical operation thereof. Further because of the pressure controlled operation of the compressor pressure relief, valves heretofore required can be eliminated.

By so providing for the controlled operation of the air compressor whereby the compressor is operated only a limited period of time comparable to engine operation, a great saving of engine horse power is attained thus affording greater motive driving force than was heretofore possible.

Referring to the drawings for more specific details of the invention, 10 represents generally a conventional internal combustion engine comprising a motor block 12, a radiator 14, and a fan 16.

An air compressor 18 for a motor vehicle, not shown, driven by engine 10 is associated with the engine and is suitably mounted on or adjacent the engine. The compressor includes a drive shaft 20 which is coupled through an electromagnetic disk clutch 22 to an auxiliary power take off pulley 24 driven from the engine drive shaft. The clutch 22 is provided with a pulley 26 having a belt connection 28 with pulley 24. The fan 16 is driven from a pulley 30 mounted adjacent pulley 24 through a belt connected between pulley 30 and a pulley 32 on the fan shaft.

The compressor 18 is provided with an air pressure hose or conduit 34 which in turn is connected to an air pressure storage tank 36. As a means of controlling the compressor operation in accordance with needs, an air pressure actuated valve 38 is interposed in the conduit 34 and provides for the making and breaking of an electrical circuit 40 to the electromagnetic clutch 22 through a suitable snap switch 42. The energizing circuit for the clutch 22 is connected with a suitable source of current, such as a storage battery 44 of the motor vehicle and includes a suitable manually operated switch 46, such as the ignition switch of the engine.

The air pressure valve 38 is operable over a reasonable range so that a small pressure change will not cause a rapid off and on operation of the compressor upon the attainment of a predetermined pressure in the storage tank.

The clutch 22 as shown by Figure 2 comprises a hub 48 sleeved upon a tapered end 50 of compressor shaft 20 and is securely held thereon by a lock nut 52 threaded upon the end of shaft 20. A sleeve 54 is mounted concentrically upon hub 48 and is aligned therewith by a plurality of pins 56 fitted in the hub and sleeve, said sleeve being secured upon the hub by a bolt 58 threaded into the shaft 20.

An electromagnetic coil 60 wound between the hub 48 and sleeve 54 has one end grounded through the hub 48 and its other end connected to a suitable contactor plate or pick up band 62. A spring pressed contactor ring 64 suitably mounted upon hub 48 has bearing relationship with band 62 and is connected to battery 44 by power supply line 40.

The pulley 26 is concentrically journalled upon bearings 65 mounted on sleeve 54 and includes a rim 66 adapted to support a number of disks 68 for limited axial movement relative thereto, the end disks of which cooperate respectively with a friction lining 70 supported on end face 72 of hub 48 and a friction lining 74 on an end plate 76 slidably splined upon sleeve 52 for axial relative movement thereto and held thereon by snap ring 78. A disk 80 interposed between disks 68 is supported for axial movement upon pins 82 secured to hub 48.

The driven disks 68 are provided with fingers 83 received in close conformity by axial splines 84 in rim 66 of pulley 26 and each have a single radial slot 86 throughout the radial width of the disks and a number of equi-spaced radial slots 88 across a substantial portion of the radial width of the disks. The disks 68 are slotted as at 86 and 88 so that in the assembly thereof upon the splines 84 the fingers 83 will resiliently hold the disks in desired position and furthermore so that when moved axially away from disks 80 upon the disengagement of the clutch will assume a position spaced from the disks 80 and thereby minimize any tending of drag between the plates 68 and 80. The friction linings 70 and 74 respectively supported on end face 72 of hub 48 and plate 76 extend a distance 90 beyond the faces thereof and as such constitute the predetermined allowable friction lining wear, said spaces constituting air gaps 92 tending to disrupt any flow of residual magnetism and thus assist in releasing drag of the plates when disengaged. The hub 48 is copper plated at 94 for the purpose of providing an additional barrier to the flow of residual magnetism. A wave spring 96 is provided between the side wall of coil 60 and end plate 76 for the purpose of assisting the end plate from disengagement with the disks upon deenergization of coil 60.

As a means of providing resilient holding engagement of the disks 68 upon the splines 84 of the pulley rim, they are initially slotted as indicated at 86 and 88 then spread radially thus increasing the over-all diameter thereof and thence radially compressed into the receiving splines 84 so as to provide a frictional holding thereon.

The exposed face of plate 76 extending beyond the lining 74 and the face 72 of hub 48 extending beyond the lining 70 constitute the pole faces of the magnetic circuit.

For the purpose of providing the most effective flow of flux lines, the disks 68 and 80 should possess characteristics of magnetic conductivity and have faces of high wear resistant material, the pins 82 of non-magnetic material so as not to divert any of the flux lines away from their path of flow and likewise the rim 66 should have non-magnetic properties.

As a result of the effective magnetic flux flow circuit provided because of the precise clutch structure herein devised, the current drawn from the power source is low with the consequence that the addition of more disks does not appreciably increase the amount of current drawn, thereby permitting the use of an unlimited number of disks depending upon the load to be absorbed.

As a safety factor should the electromagnetic clutch fail, spring pressed pins 98 are provided in the pulley 26 adapted to engage suitable slots or recesses 100 in the end face of hub 48 so as to effect a direct locking engagement between the pulley and fan.

In a normal operation of the air compressor with the switch 46 in closed position and the pressure in the storage tank below the predetermined setting of valve 38, the electromagnetic coil is energized. Concomitantly with closing the switch 46 and the starting of the engine, the pulley 26 is driven from the engine drive shaft pulley through the belt 28. Upon the energization of the coil 60 a magnetic flux is generated as indicated by dotted line 102 causing attraction between the metallic exposed surfaces respectively of the end plate 76 and hub 48; and since plate 76 is free to move axially as are disks 68 and 80, the attraction between the poles forces the plate, disks, and hub into driving contact thereby providing for transmission of torque from pulley 26 to hub 48 resulting in rotating drive shaft 20 of compressor 18. It is to be observed from the arrangement of disks between the pole faces and the path of magnetic flux as shown by the drawing that each disk carries substantially the same amount of torque since the flux lines must pass through each successive disk to complete its circuit without short circuiting.

During the flow of magnetic flux, the copper plate 94 on sleeve 54 provides a mere infinitesimal barrier to the flow and as such has no material bearing upon efficient clutch pack-up but when the coil is de-energized it becomes an effective barrier to the flow of residual magnetism and assists the air gaps 92 eliminate any drag on the clutch plates that such residual magnetism tends to produce.

Upon the attainment of an air pressure equal to the predetermined setting of air pressure valve 38, the switch 42 associated therewith is actuated to break the circuit 40 resulting in de-energizing the coil and consequently effecting an unloading of the disks 68 and 80. With the unloading of the disks 68 and 80, the disks will again assume normal positions between the respective faces thereof and pole faces with corresponding free running clearances therebetween so as to interrupt the operation of the compressor. With the return of the disks and pole faces to normal position a cycle of operation of the compressor is completed.

While this invention has been described in connection with certain specific embodiments, the principle involved is susceptible of numerous other applications that will readily occur to persons skilled in the art. The invention, is therefore, limited only as indicated by the scope of the appended claims.

What I claim is:

1. A magnetic drive comprising an output member, an end plate slidably splined at its inner periphery upon the output member axially disposed therefrom, and an electromagnet secured upon the member, a power driven pulley journalled on the member in concentric relation thereto supporting a number of friction disks internally of the axial extension thereof for axial movement relative thereto, one or more friction disks secured on the member axially moveable relative thereto alternately interposed between the disks on the pulley, said disks on the pulley and member being radially outwardly disposed from the electromagnet and positioned axially between the end plate and a portion of the output member, a ring wave spring disposed axially between the end plate and output member biasing the end plate away from the friction disks, said end plate and member each having friction linings on radial portions thereof for respective engagement with the end axially disposed friction disks.

2. A magnetic drive comprising an output member having one or more friction disks and an end plate slidably splined thereon, an annular electromagnet fixedly secured on the member, a power driven pulley journalled on the member in concentric relation thereto supporting a plurality of friction disks for axial movement relative thereto and a ring wave spring disposed axially between the electromagnet and end plate for biasing the end plate way from the disks, said disks on the member being alternately interposed between the disks on the pulley and the disks on both the pulley and member being radially outwardly disposed from the electromagnet and positioned axially between the end plate and a radially extended portion of the member, a number of the disks having resilient splined engagement with the pulley adapted to effect spaced location of said disks upon disengagement from the other disks, said end plate and member each having friction linings on radial portions thereof engageable respectively with the end axially disposed friction disks.

ROBERT C. RUSSELL.

REFERENCES CITED

The following references are of record in the file of this patent:

UNITED STATES PATENTS

| Number | Name | Date |
|---|---|---|
| 754,291 | Eastwod | Mar. 8, 1904 |
| 773,423 | Richards | Oct. 25, 1904 |
| 815,903 | Case | Mar. 20, 1906 |
| 817,730 | Williams | Apr. 10, 1906 |
| 942,187 | Ravenshaw | Dec. 7, 1909 |
| 1,166,974 | De Leeuw | Jan. 4, 1916 |
| 1,322,377 | Utterbaugh | Nov. 18, 1919 |
| 1,518,604 | Rosner | Dec. 9, 1924 |
| 1,538,029 | Detlaff | May 19, 1925 |
| 1,760,174 | Schunemann | May 27, 1930 |
| 1,760,223 | Wittkuhns | May 27, 1930 |
| 2,005,468 | Modine | June 18, 1935 |
| 2,057,876 | Berry | Oct. 20, 1936 |
| 2,214,391 | Weydell | Sept. 8, 1940 |
| 2,344,111 | Ryba | Mar. 14, 1944 |
| 2,452,264 | Russell | Oct. 26, 1948 |